US008543664B2

(12) United States Patent
Zirbel et al.

(10) Patent No.: US 8,543,664 B2
(45) Date of Patent: Sep. 24, 2013

(54) COMMUNITY NETWORK

(75) Inventors: Scott W. Zirbel, Centennial, CO (US); Timothy Jay Miller, Greenwood Village, CO (US)

(73) Assignee: Synergy Services Corporation, Denver, CO (US)

( * ) Notice: Subject to any disclaimer, the term of this patent is extended or adjusted under 35 U.S.C. 154(b) by 724 days.

(21) Appl. No.: 12/256,307

(22) Filed: Oct. 22, 2008

(65) Prior Publication Data

US 2009/0106434 A1  Apr. 23, 2009

Related U.S. Application Data

(60) Provisional application No. 60/981,751, filed on Oct. 22, 2007.

(51) Int. Cl.
  *G06F 15/16* (2006.01)
  *G06F 15/173* (2006.01)
(52) U.S. Cl.
  USPC ............ 709/218; 709/203; 709/217; 709/223
(58) Field of Classification Search
  USPC .................. 709/217–219, 203, 223–226
  See application file for complete search history.

(56) References Cited

U.S. PATENT DOCUMENTS

| | | | | |
|---|---|---|---|---|
| 6,697,865 | B1* | 2/2004 | Howard et al. | 709/229 |
| 7,631,323 | B1* | 12/2009 | Green et al. | 725/5 |
| 2002/0049622 | A1* | 4/2002 | Lettich et al. | 705/7 |
| 2003/0105659 | A1* | 6/2003 | Eisenstein | 705/10 |
| 2003/0229623 | A1* | 12/2003 | Chang et al. | 707/3 |
| 2004/0122693 | A1* | 6/2004 | Hatscher et al. | 705/1 |
| 2004/0267897 | A1* | 12/2004 | Hill et al. | 709/217 |
| 2005/0086296 | A1* | 4/2005 | Chi et al. | 709/203 |
| 2005/0198618 | A1* | 9/2005 | Lalonde et al. | 717/110 |
| 2007/0073829 | A1* | 3/2007 | Volodarsky et al. | 709/217 |
| 2009/0019162 | A1* | 1/2009 | Riddle | 709/226 |
| 2009/0249458 | A1* | 10/2009 | Banga et al. | 726/7 |

* cited by examiner

*Primary Examiner* — Ian N Moore
*Assistant Examiner* — Jenee Alexander
(74) *Attorney, Agent, or Firm* — HolzerIPLaw, PC

(57) ABSTRACT

The community network may be configured to deliver relevant, informative, and useful content regarding the client to individual users of the community. Further, individual users may be provided an opportunity to communicate with one another and to invite new users into their community. Additionally, users may collaborate with one another and with the sponsoring client. The community network system includes a set of software applications designed to support multiple clients through domains set up by a system administrator. The domains are secure partitions within the system which are accessible to unique communities of users and configured with specific tools and user roles for each client's purposes. Further, each user is assigned a role in the system based on the features and privileges that the client wishes to make available to that user in the system.

27 Claims, 12 Drawing Sheets

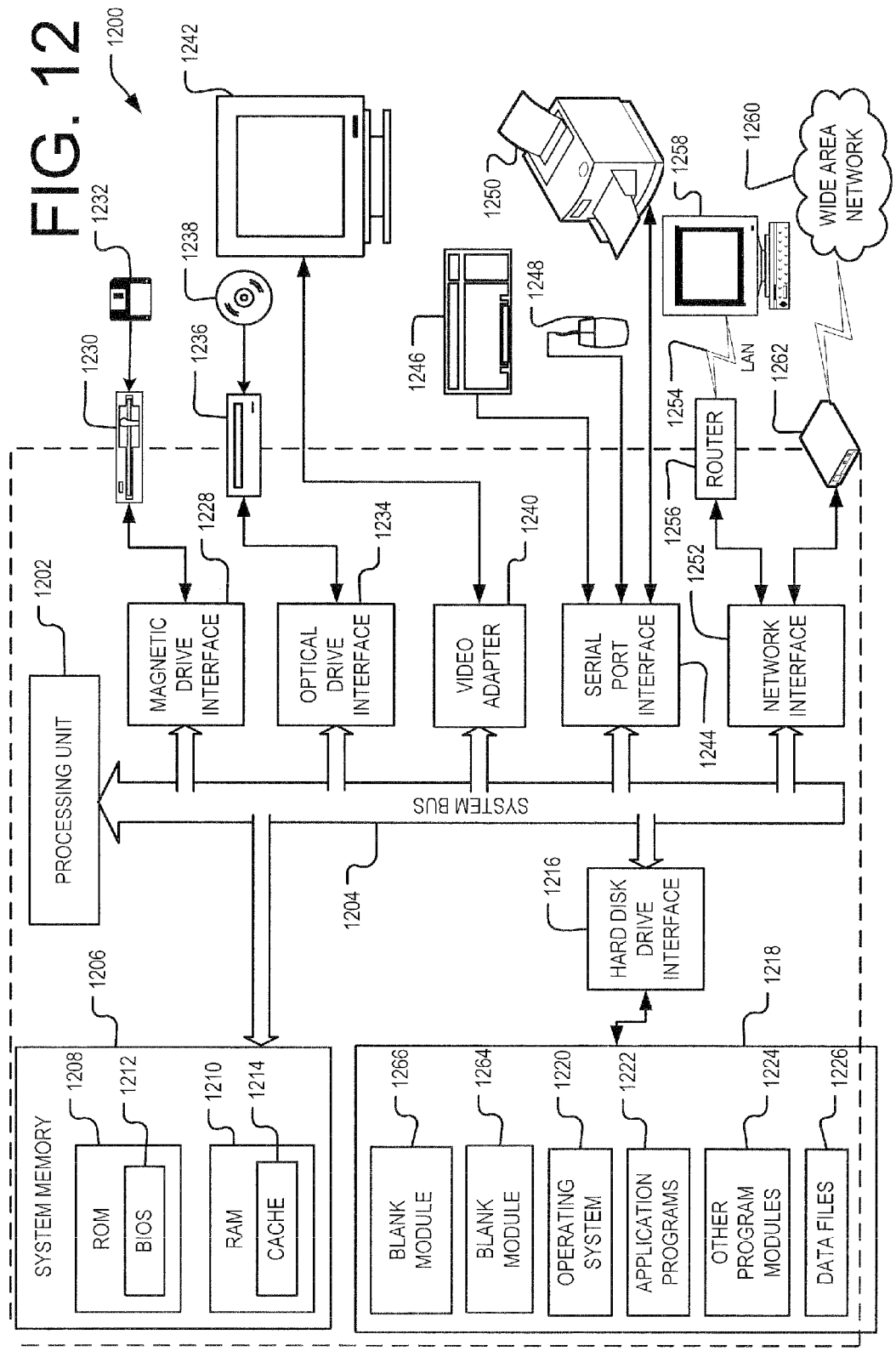

COMMUNITY NETWORK

CROSS REFERENCE TO RELATED APPLICATION

This application claims the benefit of priority to U.S. Provisional Application No. 60/981,751, entitled, "Community network," filed on Oct. 22, 2007, which is specifically incorporated herein by reference in its entirety.

FIELD OF INVENTION

The presently disclosed technology relates to community networks represented by custom client domains hosted by a global domain on partitioned storage.

BACKGROUND

Many organizations face a talent shortage when attempting to fill available job positions. This shortage can be attributed in part to the aging population of baby boomers, the decline of adult women re-entering the workforce, and younger people remaining in school for a longer period of time. Even with the advent of electronic job posting boards and networking sites, it is difficult for many organizations to reach a desired group of individuals with information regarding the organization and available positions within it. Further, existing systems fail to limit access to individuals that the organization has specifically identified such as: alumni, retired employees, previous contractors, or qualified referrals.

In a common electronic job posting scenario, an organization seeking to fill an available position may enter information into an online form from a job posting service. This information may range from very basic information, such as a brief job description and employer contact information, to very detailed information, such as specific duties, working hours, salary, benefits, etc. This information is then posted online in a searchable manner accessible either to the general public or to a limited number of job seekers that subscribe to the job posting service. The employer then receives responses from interested members of the general public or subscribing users of the job posting service and may set up interviews with individuals that appear to be a good fit for the job.

However, the organization seeking to fill an available position lacks control over which individuals are able to access the job posting. Further, the common electronic job posting scenario lacks the ability to customize the site to maximize the value and convenience of the site to the client and associated users, thereby motivating additional users to join the client's community. Importantly, previous efforts to integrate electronic job posting boards and networking sites have failed to create a community that is custom-made for a specific organization that seeks to fill available positions from a specific group of individuals.

SUMMARY

A problem is addressed by creating a community network for an organization and offering a combined job posting and networking site to users of the community network. The community network may utilize permission sets to grant access to tools and user roles defining an organization's domain. The community network solution may reduce time to hire and yield higher-quality placements by proactively targeting qualified candidate users from a limited group of users comprising the community network. Further, in one implementation, by focusing on alumni, retired employees, and previous contractors, the community network offers a group of potentially more productive employees and contractors because previous employees tend to have a lower turnover rate and a faster learning curve. The community network also offers reduced costs by reducing the pool of potential job candidates to a smaller more qualified group that may be more cost effectively evaluated. Further, in another implementation, the community network compiles past information regarding the potential job candidates, including but not limited to, job evaluations, recommendations, and academic performance. Finally, the community network contains hosted software applications tailored specifically to the sponsoring client thus offering flexibility not existent in standard job posting boards or networking sites.

BRIEF DESCRIPTION OF DRAWINGS

FIG. 5 illustrates a "Messages" tab in an example user graphical user interface of a community network.

FIG. 7 illustrates a "Forms" tab in an example user graphical user interface of a community network.

FIG. 12 is an example computer system for implementing the presently disclosed technology.

DETAILED DESCRIPTION

In one implementation, the community network system is built on a "software-as-a-service" platform and provides a set of applications designed to support multiple clients on the same instance of software through domains set up by a system administrator. The domains are secure partitions within the system, which are accessible to unique communities of users and configured with specific tools and user roles for each client's purposes.

The tools are typically implemented as software applications, and they may function standalone or in conjunction with other software applications in the system to combine functionality. Further, each user is assigned a role in the system based on the features and privileges that the client wishes to make available to that user in the system.

In one implementation, for example, a global administrator can define a first domain for a first client community with a customized set of software applications and user roles with corresponding privileges. In addition, the global administrator can define a second domain for a second client community with a different customized set of software applications and user roles with corresponding privileges. Client administrators can then manage the content and user roles within their specific domains. In this manner, the client communities may be customized for each client and set of users to provide a unique community experience.

In another implementation, the community network is customized to deliver relevant, informative, and useful content regarding the client to individual users of the community. Further, the community network may be configured to provide individual users an opportunity to communicate with one another and to invite new users into the community. Additionally, the community network may offer users the ability to collaborate with one another and with the sponsoring client.

In yet another implementation, users access the system through a browser via the Internet and the software is be staged on a server located in a secure remote data facility. The system may be configured to work behind a firewall or be accessible by any user in a public format with a secure login and password. The community network technology may include custom software development supported by specific open source plug-ins.

Figure 1:
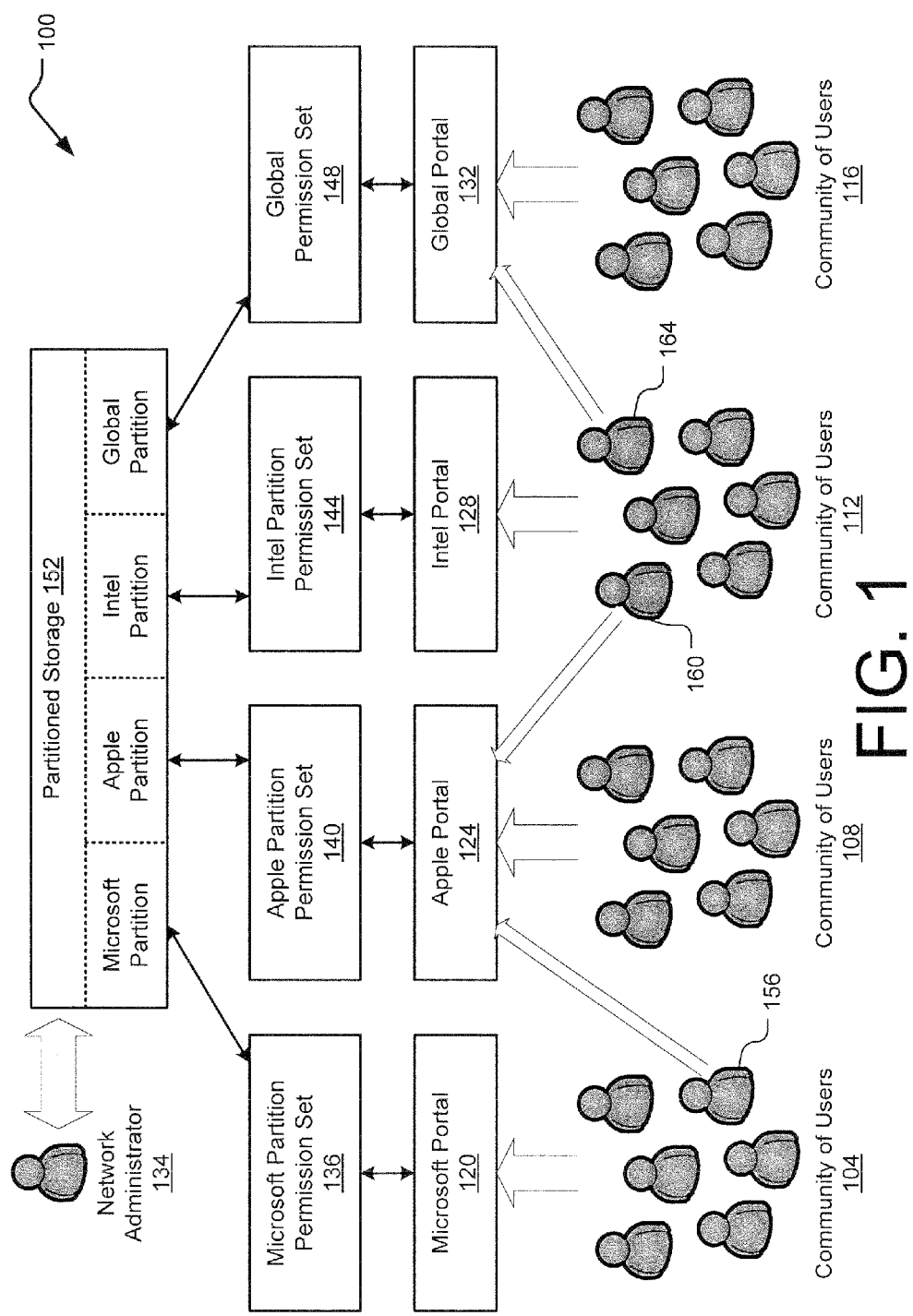
FIG. 1 illustrates an example of how individual users within groups of users associated with a client can access the client's domain located within a central storage partition space of community networks.

FIG. 1 illustrates an example of how individual users within groups of users associated with a client can access the client's domain located within a central partitioned storage space of community networks 100. In example community networks 100, there are four communities of users, Microsoft users 104, Apple users 108, Intel users 112, and Global users 116. Aside from the global community, FIG. 1 shows a respective client for each community of users: Microsoft, Apple, and Intel. Each user within each group of users accesses their client's domain via a community portal. For example, these community portals may be graphical user interfaces (GUIs) loaded on an internet browser.

The Microsoft 120, Apple 124, and Intel 128 portals are individually customized by a network administrator 134 for the particular client's needs based at least in part on permission sets. Here, the permission sets for Microsoft 136, Apple 140, and Intel 144 are assigned by the network administrator 134 based on the individual client's needs and desires communicated to the network administrator 134. Each individual client domain created is then stored in a central partitioned storage space 152. As a result, when an individual user desires to access the domain of a client, the user accesses the client's partitioned storage space hosting the client's domain.

Some users may be a part of more than one community. For example, a user 156 is a member of the Microsoft community but also has access to the Apple community 108. Similarly, a user 160 is a member of the Intel community 112 but also has access to the Apple community too.

In some implementations, there are one or more global partitions and associated global portals 132 within the community networks 100 that are set up by the network administrator 134 for individuals who want to be a part of the community networks 100 but are not yet members of or do not desire to join a specific client's community. The global partitions are customized by the network administrator 134 based on global needs. As such, the permission set for global 148 is assigned by the network administrator 134 based on global needs. Here, users 116 are global users. Additionally, some users may be a member of the global community 116 as well as a member of a specific client community. Here, a user 164 is a member of the Intel community 112 but also has access to the global community 116 as well.

Figure 2:
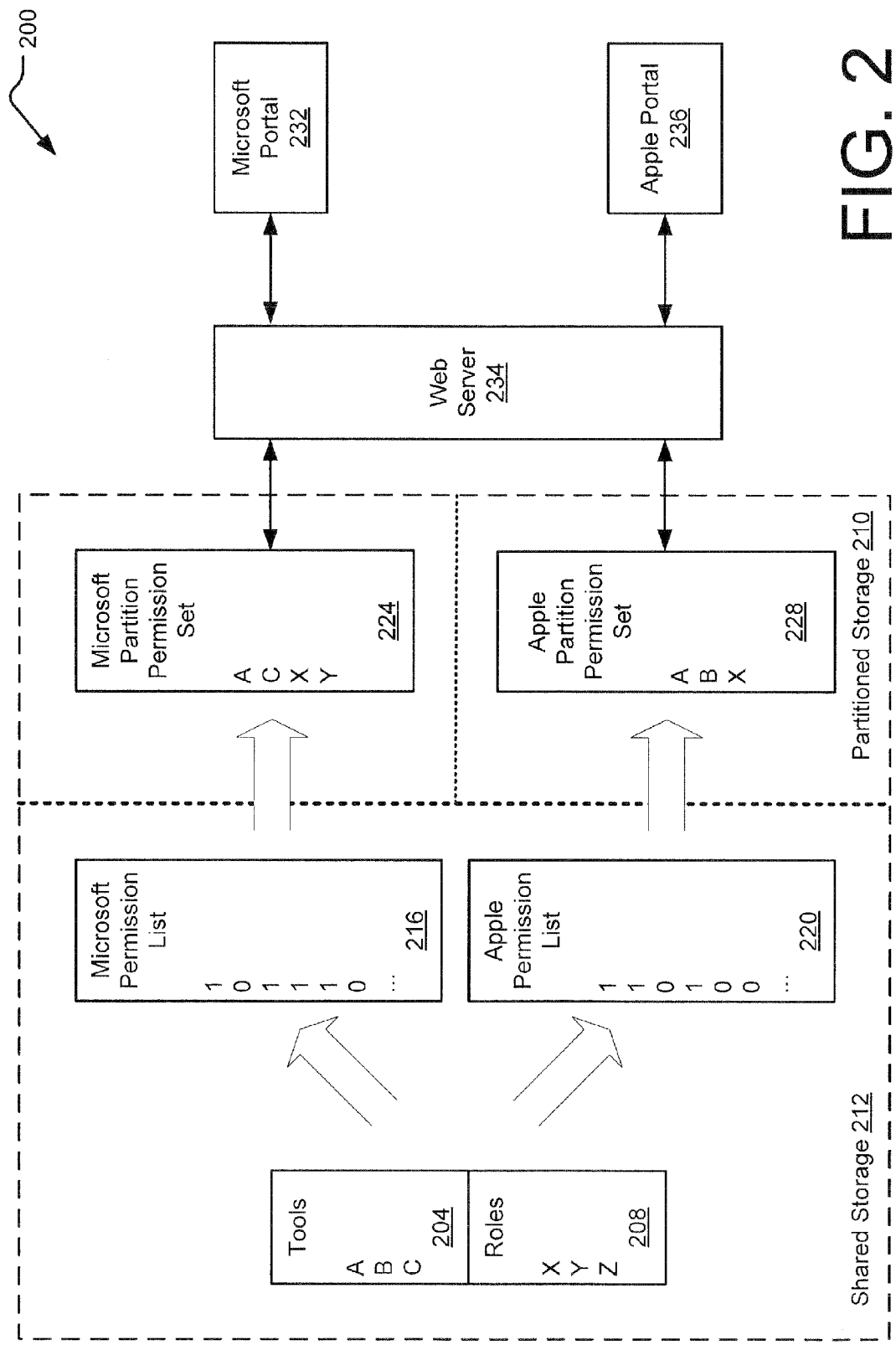
FIG. 2 illustrates example assignment of various tools and user roles to client domains within storage partitions of community networks.

FIG. 2 shows example assignment of various tools 204 and user roles 208 to client domains within the partitioned storage space 210 of community networks 200. All of the available tools 204 for the community networks 200 are referred to as a tool set. All of the available user roles 208 for the community networks 200 are referred to as a role set. The tool set and the role set are stored in the centrally located shared storage 212. The tools 204 and user roles 208 may be custom created for a specific client or available for a number of clients to use. Further, custom created tools 204 and user roles 208 may be proprietary to a specific client or the client may share the custom tools 204 and user roles 208 with other clients. In one implementation, the client communicates functionality requirements and desires to a network administrator who then creates any additional custom tools 204 and user roles 208 for the client.

Some example tools 204 that may be available to and/or custom created for a client include: an account creation/modification tool, a messaging tool, a tool for creating referrals, a tool for creating, viewing, modifying and/or filling out forms, a tool for viewing, posting and/or responding to jobs, a forum tool, a blogging tool, a tool for posting and viewing various media, a tool for ensuring user compliance with a client directive, a tool for enrolling users for a specific function, a tool for viewing a list of job candidates, and a tool for generating, viewing, and/or modifying reports. Further, in one implementation, the tools 204 may be implemented in the community network as software applications. These tools will be discussed in further detail below. In addition, three example user roles include a global administrator role, a client administrator role, and a candidate user role. These user roles will be discussed in further detail below.

In FIG. 2, communities are defined for multiple clients, including communities of users for clients Microsoft and Apple. As part of defining such communities, the network administrator assigns a permission list for each client's level of access to the tools 204 and user roles 208 within the shared storage 212. Here, permission lists for Microsoft 216 and Apple 220 are assigned by the network administrator and govern which tools 204 and user roles 208 are accessible from shared storage 212 to Microsoft and Apple storage partition 210. In one implementation, the permission lists are binary lists, indicating 0 or 1 for each of the tools 204 and user roles 208 within the shared storage 212. In another implementation, the permission lists contain reference codes corresponding to one or more lists of tools 204 and user roles 208 and further reference codes that correspond to each of the selected tools 204 and user roles 208 of the selected lists within the shared memory 212.

A Microsoft partition permission set 224 and an Apple partition permission set 228 are created to indicate which tools 204 and user roles 208 are accessible from shared storage 212 to a Microsoft portal 232 and the Apple portal 236. Here, based on the permission list 216, the Microsoft partition permission set 224 includes tools 204 A and C and user roles 208 X and Y. Based on the permission list 220, the Apple partition permission set 228 includes tools 204 A and B and role 208 X. Thus, the tools 204 and user roles 208 accessible through the Microsoft portal 232 are different than the tools 204 and user roles 208 accessible through the Apple portal 236. Finally, the tools 204 and user roles 208 accessible to each client's community portal may be served to the community portal by a web server 234. Here, the Microsoft tools 204 and user roles 208 are served to the Microsoft portal 232 and the Apple portal 236 by the web server 234.

Figure 3:
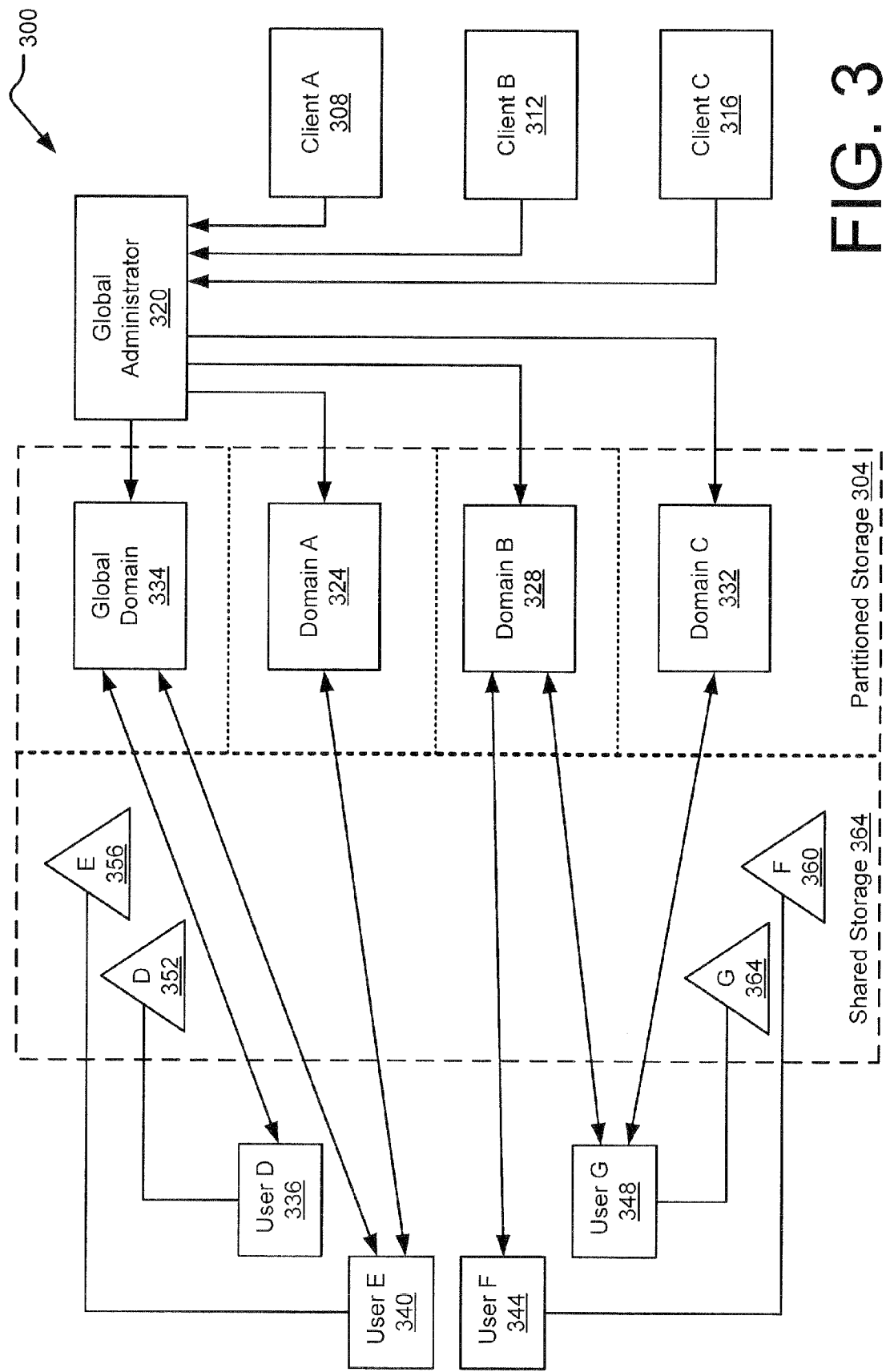
FIG. 3 illustrates example user access to client domains within storage partitions of community networks.

FIG. 3 illustrates example user access to example client domains within the community storage partition 304 of community networks 300. Client A 308, client B 312, and client C 316 contact a global administrator 320 of community networks 300 to set up client domains A 324, B 328, and C 332 respectively. The global administrator 320 creates the client domains in storage partitions 304 with functionality as requested by the individual clients. Further, in some implementations, the global administrator 320 sets up a global domain 334 not associated with a specific client and thus without access limited by the specific client.

Once the client domains A 324, B 328, and C 332 are set up by the global administrator 320, users D 336, F 340, F 344, and G 348 submit their respective profiles D 352, E 356, F 360, and G 364 to the global administrator 320 to be stored in shared storage 364. Domains A 324, B 328, C 332 and global 334 have access to the profiles of users stored within the shared storage 364. Alternatively, user profiles D 352, E 356, F 360, and G 364 are stored directly within the community storage partitions of their community's respective domains.

Users may be members of at least one community and access their community's domain. Here, user D 336 is a member of the global community and community A, thus user D can access the global domain 334 and domain A 324 and specifically the tools and user roles accessible by both domains. User E 340 is a member of community A only, thus user E 340 can only access domain A 324. User F 344 is a member of community B only, thus user F 344 can only access domain B 328. User G 348 is a member of communities B and C, thus user G 348 can access domain B 328 and domain C 332.

The community network user interface contains software applications designed to foster content, community, and collaboration among users of the system. Applications representing community tools are introduced as "tabs" on the top row with sub tabs serving as supporting applications, although other user interface designs may be employed. At the highest level, the applications include My Account 400, Messages 500, Referrals 600, Forms 700, Jobs 800, Forum 900, and Blog 100. Additional applications not shown include, but are not limited to, Media, Compliance, Enrollment, Candidates, and Reports as described below. The community network interface is granted a level of access to the tools corresponding to the aforementioned applications through a permission set as described above.

In one implementation, each user is assigned a role in the system. User roles may be configured by the system administrator or client based on the desired level of access to features and privileges for each individual in the system. The community network interface is granted access to the available user roles through a permission set as described above. Described below are three example user roles in the system listed in order of decreasing level of transparency and access. A "system administrator" role has full transparency and access throughout the system and is the role used to set up domains for individual clients.

A "client administrator" role is managed by the client and allows the client full access to customize their domain for their purposes. In an example implementation, within the client administrator role, the main "Account" tab contains general information on the profile of the client administrator user of the system as well as sub tabs enabling the client administrator to customize the client domain.

A "candidate user" role is typically an external user of the system. The candidate user role in the system is the user role for individuals who are invited in to the system or self register in the system and thus have limited access to the community network. In some implementations, candidates manage profile information, view content, participate in surveys, blogs, forums and messaging, apply for jobs, and initiate referrals. Once registered in the system, a candidate may log in via a secure password to perform the functions described in the system. Additional user roles may be customized to extend functionality and privileges on an as needed basis.

Figure 4:
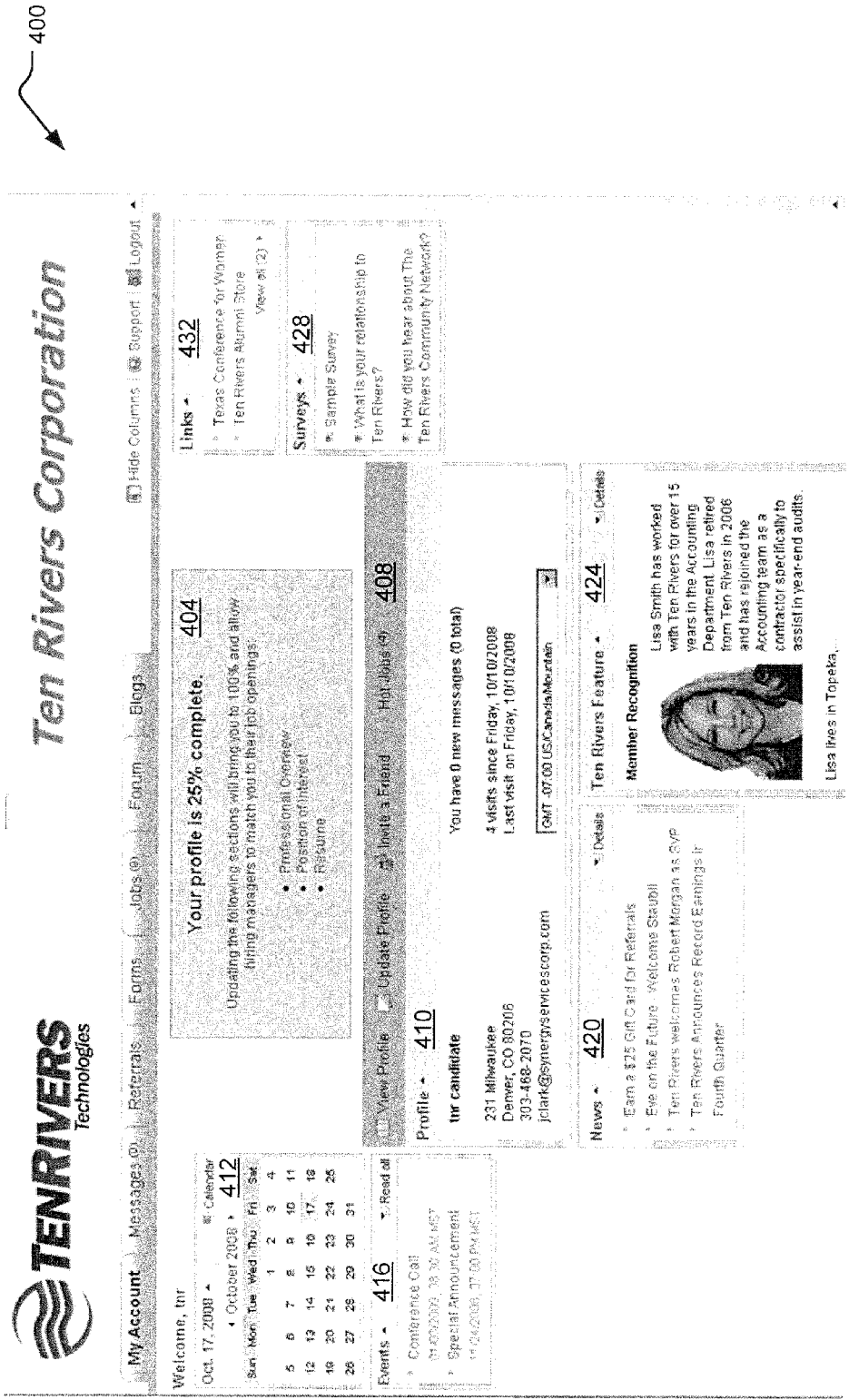
FIG. 4 illustrates a "My Account" tab in an example user graphical user interface of a community network.

FIG. 4 illustrates the "My Account" tab 400 in an example user graphical user interface of a community network. Under the My Account tab, a status window 404 indicates the completion status of the user's profile, including suggested sections to add. Further, sub tabs 408 enable the user view and/or update his/her profile information 410, invite a friend, and look at job listings. Further, the user can view a calendar 412, upcoming events 416, community news 420, and a community feature 424. The user can also take surveys 428 and follow suggested links 432 to related content.

Figure 5:
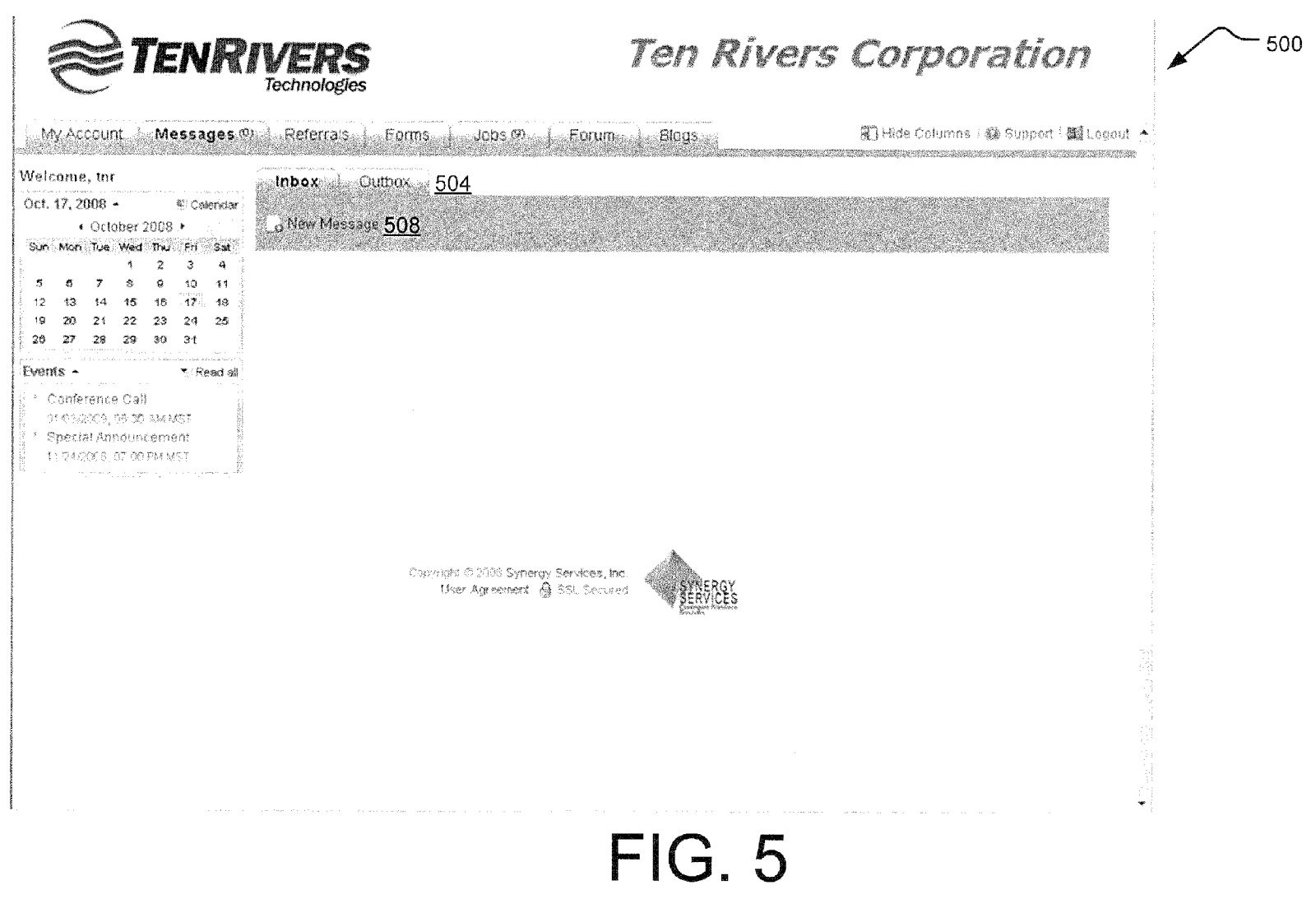

FIG. 5 illustrates the "Messages" tab 500 in an example user graphical user interface of a community network. A complete messaging system for sending and receiving messages within the system or extending notifications to external e-mail systems may be included. The messaging system fosters one-to-one or one-to-many communications with users of the system. Here, inbox and outbox sub tabs 504 are included. Within the inbox, the user can select to create a new message 508.

Figure 6:
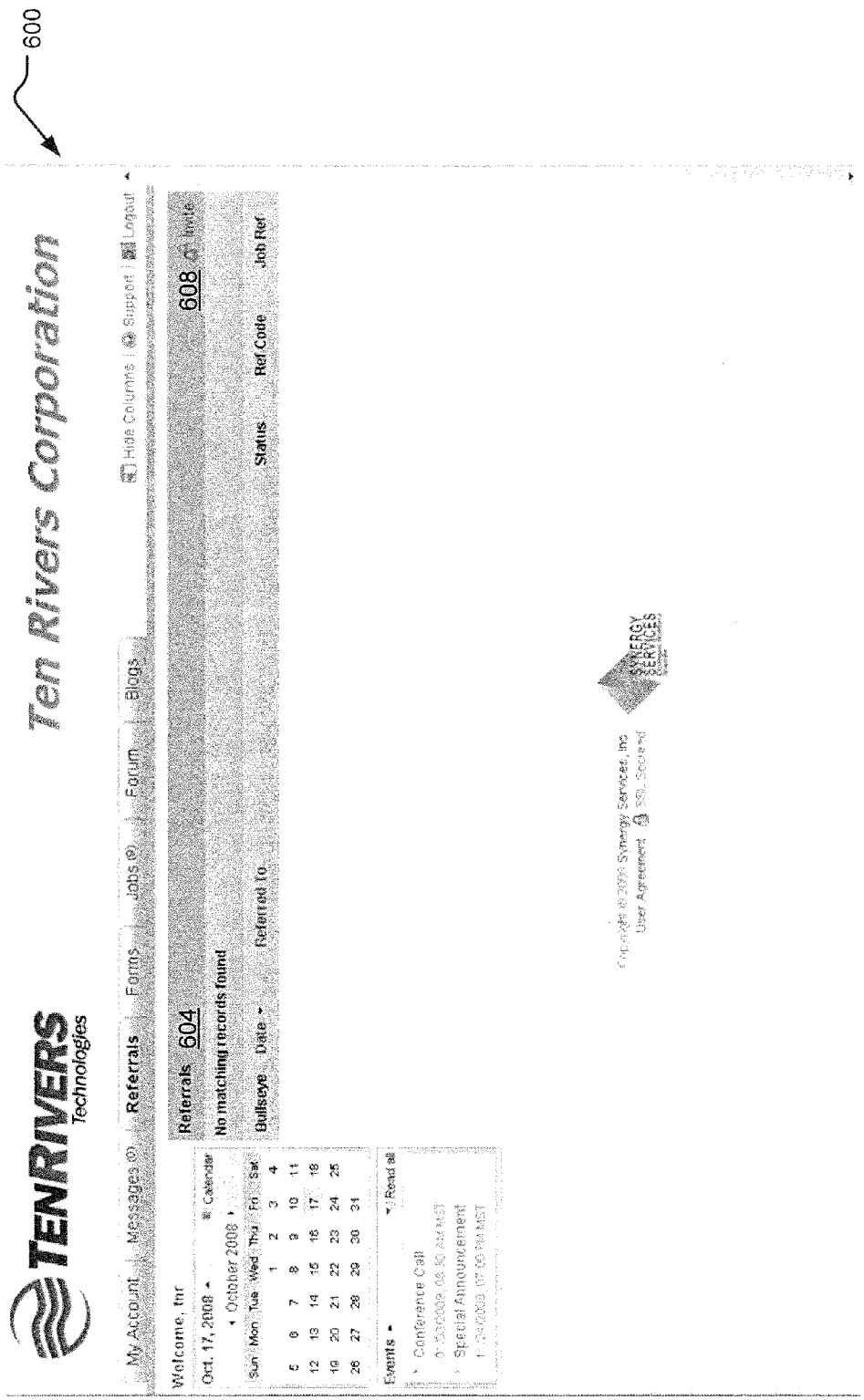
FIG. 6 illustrates a "Referrals" tab in an example user graphical user interface of a community network.

FIG. 6 illustrates the "Referrals" tab 600 in an example user graphical user interface of a community network. There may be two forms of referrals in the community network. A job referral is a notification that is sent to an outside user based on a specific job requisition in the system. A user who receives a job referral can register in the system and apply for the position once they are accepted in to the system. The second form of referral in the system is an "Invite" from a candidate. This form of referral is a message initiated by a candidate user to an outside user as an invitation to join the network. Here, the referrals list 604 is empty, but the user has the option of inviting a new user 608 is he/she desires.

Figure 7:
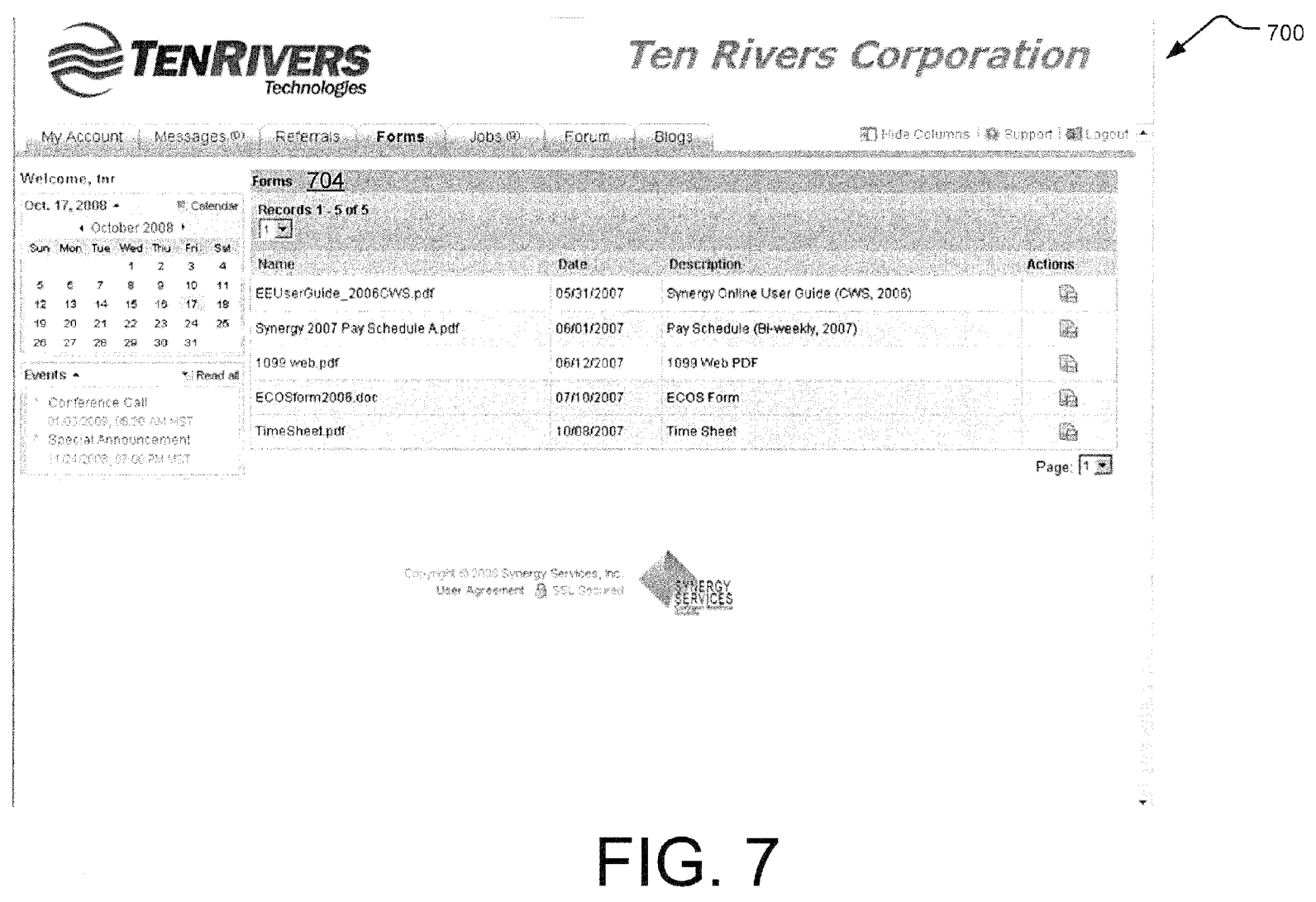

FIG. 7 illustrates the "Forms" tab 700 in an example user graphical user interface of a community network. Documents that may be relevant to at least some users of a particular community are included in the Forms section. Use of forms may significantly aid the wide distribution of general information regarding the client and/or community network to the community of users. Here, there are five forms in the Forms list 704. The user is be presented with a title, date created, and brief description of each form. Further, the user may be able to download forms from the list.

Figure 8:
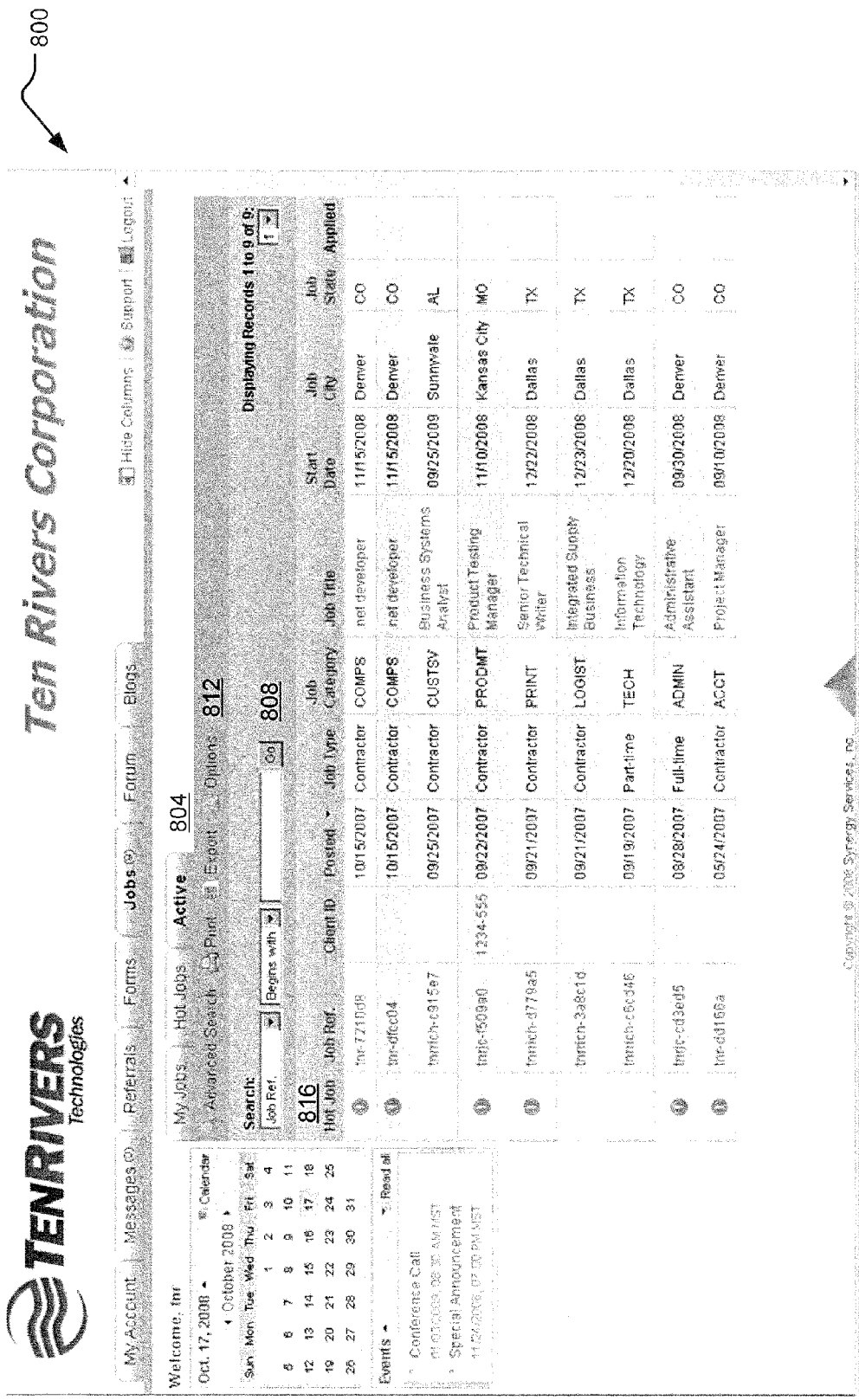
FIG. 8 illustrates a "Jobs" tab in an example user graphical user interface of a community network.

FIG. 8 illustrates the "Jobs" tab 800 in an example user graphical user interface of a community network. The Jobs application is a tool for extending available jobs to users within the system. One feature within the Jobs application is the targeting feature. Targeting allows the client to automatically discover candidate users within the system that have specific targeted parameters for a particular job. The client can target based on job category, type, level, geographic location, and radius to determine the best candidate users in the system for a particular position and communicate via e-mail notification to these individuals. In addition to the targeting feature, the Jobs application may have ease of use features that allow the client user to manage large volumes of applicants and/or priority jobs (e.g. flags that allow the client users to manage incoming applicants for a particular position).

Here, the user is presented with sub tabs 804 "My Jobs," "Hot Jobs," and "Active." In one implementation, My Jobs lists jobs that the user has applied for or expressed an interest in. Alternatively, the My Jobs list may contain jobs that the user has marked for a more detailed review later. The Hot Jobs list may include jobs that the client may consider a top priority to fill, they may be more advanced jobs with better compensation, or they may be jobs that are full-time or staff positions rather than part-time or contractor positions. The Active job list includes all positions that the client is currently seeking to fill.

Within any of the sub tabs, the user is presented with a basic search window 808 to help the user narrow down a long list of jobs. Further, the user may be presented with additional options 812 such as: an advanced search, print, export job list to a spreadsheet, and other options consistent with the use of the list of jobs. Each job in the job list includes specific information on the job 816 including, but not limited to: whether it is a Hot Job, a Job Reference Number, a Client ID, the date the job was posted, job type, job category, job title, a proposed start date, the job's city and state, and an indication whether or not the user has applied for the job.

Figure 9:
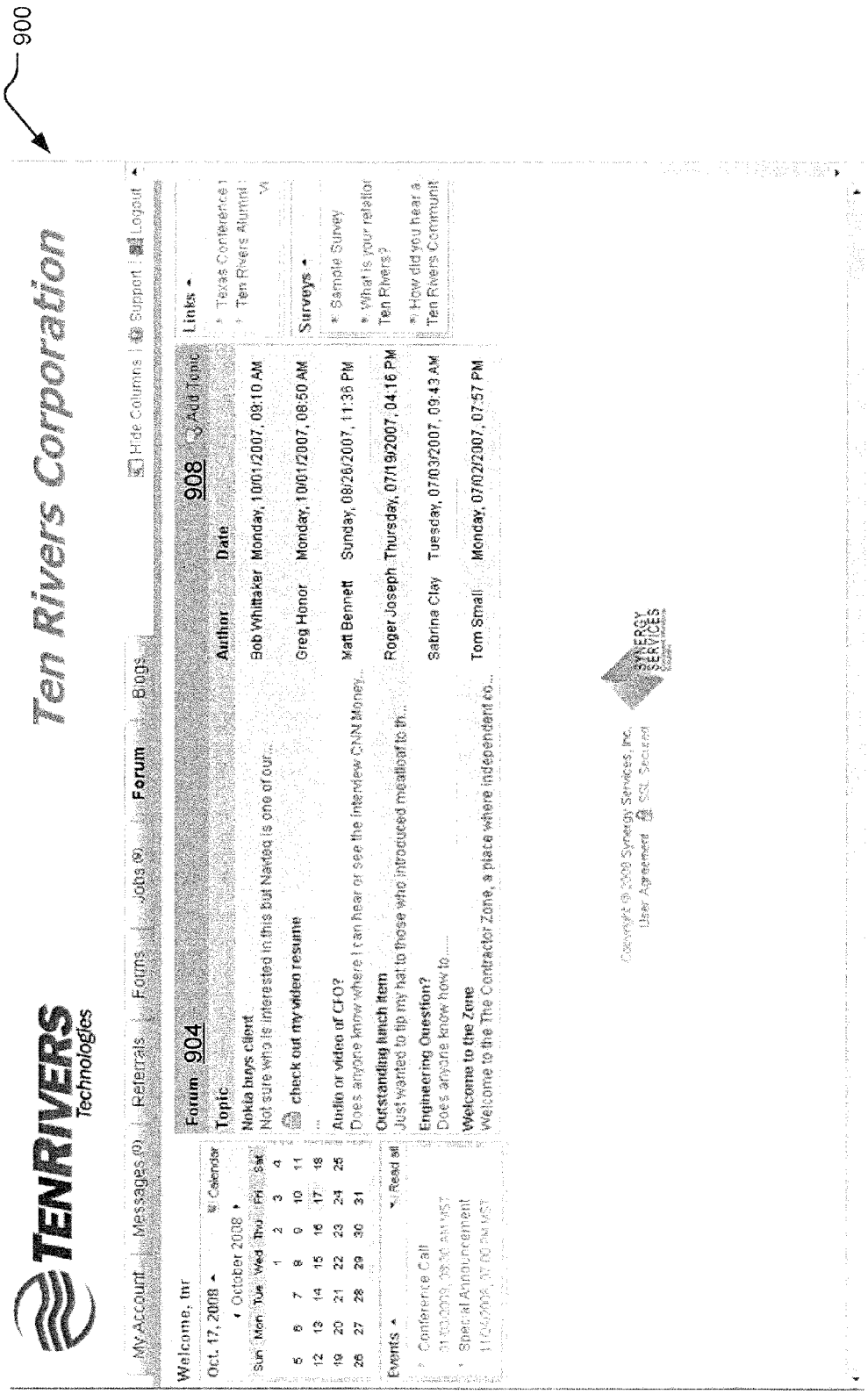
FIG. 9 illustrates a "Forum" tab in an example user graphical user interface of a community network.

FIG. 9 illustrates the "Forum" tab 900 in an example user graphical user interface of a community network. The Forum application is a many to many communications tool designed to allow users to post topics and manage a string of responses to the initial topic. Forums may be initiated by clients and/or candidate users within the system. Forums allows for information sharing including requests, inquiries and message boards. Users may also post content which then may receive replies from other users of the system. Here, the forum list 904 includes five forum strings; "Nokia Buys Client," "Audio or Video of CFO," "Outstanding Lunch Item," "Engineering Question?," and "Welcome to the Zone." Each forum string is identified by the topic, author, and/or date originally posted. If a user desires to participate in a specific forum topic, he/she selects the topic and reads and/or posts responses. Further, a user can add a topic 908 for discussion.

Figure 10:
FIG. 10 illustrates a "Blogs" tab in an example user graphical user interface of a community network.

FIG. 10 illustrates the "Blogs" tab 1000 in an example user graphical user interface of a community network. The Blogs application is a one-to-many communications tool for user authors to post content that may be viewed by all users of the system with the ability to generate feedback on the topic created by the author user. The blogs application may further contain a content filter that can set to exclude or include blogs containing specific words tagged by the system due to the nature of the blog's content. Here, two blogs are displayed in the blog list 1004, "Cloud Computing Reality Check," and "5 Web Lessons From Google's Analytics Guru." The user can view a picture of the author along with his name and the date of the last posting for each blog.

Additionally, a Media application is a tool that is used by the client administrator to create a customized user environment and content for each client. Through the Media application, the client administrator user may create content such as news releases, feature articles, events on the event calendar, an online survey, links, and banners. In some implementations, the content is be archived and has a start as well as an optional expiration date in the system. Each Media application tool may have an embedded editor to format the content within each domain. Events may be localized to users in a specific domain, users in a group of domains, or all users in the community network. In addition, real-time survey results may be created by the client administrator and viewed and/or taken by candidate users.

The Compliance and Enrollment applications can work within the system, but also may serve as stand alone applications in the system. In one implementation, enrollment allows candidates to be activated in the system for purposes of pay rolling. In another implementation, the compliance application allows the system or client administrator to initiate a compliance test to determine whether a candidate user is an employee or an independent contractor. The system may initiate an e-mail notification to the candidate user that leads to a survey which is automatically scored by the system using a weighting system. The output of the scoring is a recommendation to be reviewed by the system administrator or another role created within the system.

The Candidates application includes a repository of candidate users in the system. Candidates can self register within the system or be invited to the system from the client administrator. The client administrator may then determine if they want new candidate users to immediately be accepted in to the network, or through an approval process. A client user may perform a quick search for a particular individual in the system or a more advanced search using an advanced search tool within the system. The advanced search may allow the client to search for candidates using structured data, unstructured data, and/or a radius search based on geography. Clients create groups within the system based on any criteria, and refresh the groups at any point to update the group. Alternatively, the client can wish the group remain static based on the initial group setup criteria. Groups may be integrated with a messaging application to send group message distributions. Client users may view candidate user profiles in summary or in detail from this application.

In one implementation, the reporting application provides standard reports and a reporting tool be used to create custom reports in the system. Under the standard reporting, reports can be created by selecting specific information to be displayed as well as sorting and filtering features to create the specific report desired by the user.

Figure 11:
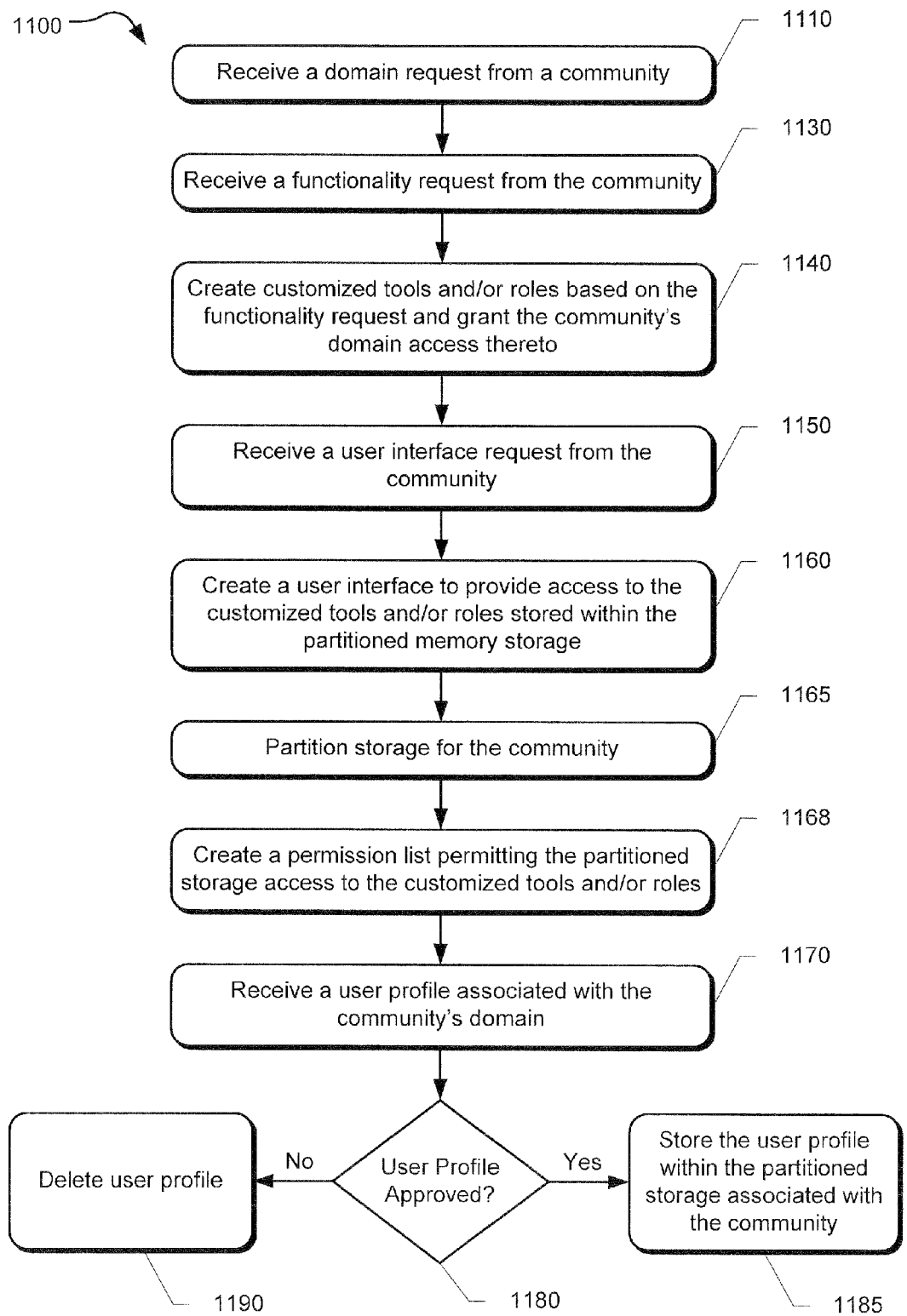
FIG. 11 is a flow chart illustrating an example process for creating a client domain within a community network.

FIG. 11 is a flow chart illustrating an example process 1100 for creating a community domain within a community network. The system administrator of a community network may receive a domain request from a client administrator of a new community 1110. The system administrator may then receive a functionality request from the client administrator of the community 1130. The functionality request may include information regarding what the client administrator of the community hopes to provide and/or control within the new community. This functionality may be general, allowing the system administrator significant flexibility in designing the community domain. Alternatively, this information may be very specific. For example, the client administrator may request specific user roles and tools that do not currently exist in the community network.

The system administrator may create such user roles and tools as per the client administrator's instructions and grant the community's domain access to the custom user roles and tools 1140 as well as any standard user roles and tools. Further, the client administrator may instruct the system administrator to either allow other communities to use their custom user roles and tools if desired or to keep the custom user roles and tools private and exclusive to the originating community alone.

Once the community domain is created, the system administrator may receive a user interface request from the client administrator of the community 1150. Similar to the functionality request, the client administrator may give the system administrator either general or very specific instructions as to the design of the user interfaces. Accordingly, the system administrator may then create one or more user interfaces to provide access to the customized tools and/or user roles 1160. Next, the system administrator may partition storage 165 for the community domain and user profiles. Finally, the system administrator may create a permission list corresponding to custom user roles and tools as well as any standard user roles and tools that the community domain may have access to 1168.

The system administrator may then receive a user profile associated with the community domain 1170. The system administrator may query the client administrator, or use an automated system to approve the user's request to have his/her user profile added to the community domain 1185. If the user profile is approved, the system administrator may store the user profile on the partitioned storage associated with the community. Alternatively, the user profile may be stored on the shared storage so that it may the accessed by more than one community, if desired. If the user profile is not approved, it may be deleted from the system 1190.

FIG. 12 illustrates components of an example system that can be useful in the implementation of the described technology. A general purpose computer system 1200 is capable of executing a computer program product to execute a computer process. Data and program files may be input to the computer system 1200, which reads the files and executes the programs therein. Some of the elements of a general purpose computer system 1200 are shown in FIG. 12 wherein a processor 1202 is shown having an input/output (I/O) section 1204, a Central Processing Unit (CPU) 1206, and a memory section 1208. There may be one or more processors 1202, such that the processor 1202 of the computer system 1200 comprises a single central-processing unit 1206, or a plurality of processing units, commonly referred to as a parallel processing environment. The computer system 1200 may be a conventional computer, a distributed computer, or any other type of computer. The described technology is optionally implemented in software devices loaded in memory 1208, stored on a configured DVD/CD-ROM 1210 or storage unit 1212, and/or communicated via a wired or wireless network link 1214 on a carrier signal, thereby transforming the computer system 1200 in FIG. 12 to a special purpose machine for implementing the described operations.

The I/O section 1204 is connected to one or more user-interface devices (e.g., a keyboard 1216 and a display unit 1218), a disk storage unit 1212, and a disk drive unit 1220. Generally, in contemporary systems, the disk drive unit 1220 is a DVD/CD-ROM drive unit capable of reading the DVD/CD-ROM medium 1210, which typically contains programs and data 1222. Computer program products containing mechanisms to effectuate the systems and methods in accordance with the described technology may reside in the memory section 1204, on a disk storage unit 1212, or on the DVD/CD-ROM medium 1210 of such a system 1200. Alternatively, a disk drive unit 1220 may be replaced or supplemented by a floppy drive unit, a tape drive unit, or other storage medium drive unit. The network adapter 1224 is capable of connecting the computer system to a network via the network link 1214, through which the computer system can receive instructions and data embodied in a carrier wave. Examples of such systems include PowerPC systems offered by Apple Computer, Inc., personal computers offered by Dell Corporation and by other manufacturers of Intel-compatible personal computers, AMD-based computing systems and other systems running a Windows-based, UNIX-based or other operating system. It should be understood that computing systems may also embody devices such as Personal Digital Assistants (PDAs), mobile phones, gaming consoles, set top boxes, etc.

When used in a LAN-networking environment, the computer system 1200 is connected (by wired connection or wirelessly) to a local network through the network interface or adapter 1224, which is one type of communications device. When used in a WAN-networking environment, the computer system 1200 typically includes a modem, a network adapter, or any other type of communications device for establishing communications over the wide area network. In a networked environment, program modules depicted relative to the computer system 1200 or portions thereof, may be stored in a remote memory storage device. It is appreciated that the network connections shown are examples and other means of and communications devices for establishing a communications link between the computers may be used.

In an example implementation, a community network application, My Account application, Messages application, Referrals application, Forms application, Jobs application, Forum application, and Blog application, Media application, Compliance application, Enrollment application, Candidates application, Reports application, and other applications may be incorporated as part of the operating system, application programs, or other program modules. Community network data, My Account data, Messages data, Referrals data, Forms data, Jobs data, Forum data, and Blog data, Media data, Compliance data, Enrollment data, Candidates data, Reports data, and other data may be stored as program data in memory 1208 or other storage systems, such as disk storage unit 1212 or DVD/CD-ROM medium 1210.

The above specification, examples and data provide a complete description of the structure and use of example implementations of the described articles of manufacture and methods. Since many implementations can be made without departing from the spirit and scope of the invention, the invention resides in the claims hereinafter appended.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Furthermore, certain operations in the methods described above must naturally precede others for the described method to function as described. However, the described methods are not limited to the order of operations described if such order sequence does not alter the functionality of the method. That is, it is recognized that some operations may be performed before or after other operations without departing from the scope and spirit of the claims.

What is claimed is:

1. A community network system accessed through a first community portal and a second community portal, the community network system comprising:
    a tool set including software applications that provide portal functionality within the community network system;
    a role set defining user roles, each user role being defined by a permission set, each permission set specifying a level of access to the tool set within the community network system;
    a first permission list designating software applications of the tool set and user roles of the role set as a first partition permission set available to an administrator of the first community portal for creating the first community portal, wherein the first community portal administrator is restricted to selecting software applications and user roles within the first partition permission set for inclusion in the first community portal;
    a second permission list designating software applications of the tool set and user roles of the role set as a second partition permission set available to an administrator of the second community portal for creating the second community portal, wherein the second community portal administrator is restricted to selecting software applications and user roles within the second partition permission set for inclusion in the second community portal;

a web server computer that serves the software applications and the user roles through the first community portal and the second community portal, the software applications and user roles within the first partition permission set being different than the software applications and user roles within the second partition permission set.

2. The community network system of claim 1, wherein the tool set includes at least one customized software application providing functionality specified for the first community portal.

3. The community network system of claim 1, wherein the tool set includes at least one customized software application providing functionality specified for the first community portal, the first permission list designating the at least one customized software application as being accessible through the first community portal, and the second permission list designating the at least one customized software application as being inaccessible through the second community portal.

4. The community network system of claim 1, wherein the role set includes at least one customized user role having a level of access to the tool set.

5. The community network system of claim 1, wherein the role set includes at least one customized user role having a level of access to the tool set, the first permission list designating the at least one customized user role as being available through the first community portal, and the second permission list designating the at least one customized user role as being unavailable through the second community portal.

6. The community network system of claim 1, further comprising:
a first community storage partition storing user profiles associated with individual users accessing the community network system through the first community portal.

7. The community network system of claim 1, further comprising:
shared storage accessible through the first community portal and storing user profiles defining individual users accessing the community network system through the first community portal.

8. The community network system of claim 1, wherein the role set includes a system administrator with complete access to the software applications and the user roles within the community network system.

9. The community network system of claim 1, wherein the role set includes a client administrator with complete access to the software applications and user roles designated by the first permission list.

10. The community network system of claim 1, wherein the role set includes a candidate user with limited access to the software applications and user roles designated by the first permission list.

11. The community network system of claim 1, wherein the software applications and user roles available to the administrator of the first community portal are stored in a partitioned storage accessible from the first community portal and the software applications and user roles available to the administrator of the second community portal are stored in a partitioned storage accessible from the second community portal.

12. The community network system of claim 1, wherein the user roles selectively designate portal functionality and privileges available to users of the first and second community portals.

13. The community network system of claim 1, wherein one of the selectively designated software applications of the tool set comprises:
a compliance test application configured to send a user a survey, evaluate the survey based on the user's responses, and output a score based on the evaluation.

14. A method for providing access to a tool set of software applications and a role set of user roles through a first community portal and a second community portal in a community network system, the method comprising:
designating software applications of the tool set and user roles of the role set as a first partition permission set available to an administrator of the first community portal for creating the first community portal, based on a first permission list, wherein the first community administrator is restricted to selecting the software applications and user roles within the first partition permission set for inclusion in the first community portal;
designating software applications of the tool set and user roles of the role set as a second partition permission set available to an administrator of the second community portal for creating the second community portal, based on a second permission list, wherein the second community administrator is restricted to selecting the software applications and user roles within the second partition permission set for inclusion in the second community portal;
serving through the first community portal the software applications and user roles within the first partition permission set;
serving through the second community portal the software applications and user roles within the second partition permission set, wherein the first partition permission set differs from the second partition permission set.

15. The method of claim 14, further comprising:
creating at least one customized software application of the tool set.

16. The method of claim 14, further comprising:
creating at least one customized user role of the role set.

17. The method of claim 14, further comprising:
receiving a user profile through the first community portal;
storing the user profile within a first community storage partition.

18. The method of claim 14, further comprising:
receiving a user profile through the first community portal;
storing the user profile within a shared storage accessible through the first community portal.

19. The method of claim 14, further comprising:
receiving a user profile defining a user through the first community portal;
editing the user profile using information provided through the first community portal regarding the user.

20. The method of claim 14, wherein one of the selectively designated software applications of the tool set comprises:
a compliance test application configured to send a user a survey, evaluate the survey based on the user's responses, and output a score based on the evaluation.

21. The method of claim 14, wherein the first permission list and the second permission list are stored in a shared storage of the community network system.

22. The method of claim 14, wherein the software applications and user roles available to the administrator of the first community portal are stored in a partitioned storage accessible from the first community portal and the software applications and user roles available to the administrator of the second community portal are stored in a partitioned storage accessible from the second community portal.

23. The method of claim 14, wherein the user roles selectively designate portal functionality and privileges available to users of the first and second community portals.

24. A tangible, non-signal computer-readable storage medium having computer-executable instructions for performing a computer process that provides access to a tool set of software applications and a role set of user roles through a first community portal and a second community portal in a community network system, the computer process comprising:
    designating software applications of the tool set and user roles of the role set as a first partition permission set available to an administrator of the first community portal for creating the first community portal, based on a first permission list, wherein the first community administrator is restricted to selecting the software applications and user roles within the first partition permission set for inclusion in the first community portal;
    designating software applications of the tool set and user roles of the role set as a second partition permission set available to an administrator of the second community portal for creating the second community portal, based on a second permission list, wherein the second community administrator is restricted to selecting the software applications and user roles within the second partition permission set for inclusion in the second community portal;
    serving through the first community portal the software applications and user roles within the first partition permission set;
    serving through the second community portal the software applications and user roles within the second partition permission set, wherein the first partition permission set differs from the second partition permission set.

25. The tangible, non-signal computer-readable storage medium of claim 24, wherein the computer process further comprises:
    creating at least one customized software application of the tool set.

26. The tangible, non-signal computer-readable storage medium of claim 24, wherein the computer process further comprises:
    creating at least one customized user role of the role set.

27. The community network system of claim 1, wherein the first permission list and the second permission list are stored in a shared storage of the community network system.

* * * * *